United States Patent
Kaczmarek et al.

(10) Patent No.: US 10,528,282 B2
(45) Date of Patent: Jan. 7, 2020

(54) MODIFYING AND UTILIZING A FILE STRUCTURE IN A DISPERSED STORAGE NETWORK

(71) Applicant: International Business Machines Corporation, Armonk, NY (US)

(72) Inventors: Joseph M. Kaczmarek, Chicago, IL (US); Ethan S. Wozniak, Park Ridge, IL (US); Ilya Volvovski, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

(21) Appl. No.: 15/842,596

(22) Filed: Dec. 14, 2017

(65) Prior Publication Data
US 2018/0107423 A1   Apr. 19, 2018

Related U.S. Application Data

(63) Continuation-in-part of application No. 15/006,735, filed on Jan. 26, 2016, now Pat. No. 10,079,887.
(Continued)

(51) Int. Cl.
*G06F 13/00* (2006.01)
*G06F 3/06* (2006.01)
*G06F 11/10* (2006.01)

(52) U.S. Cl.
CPC .......... *G06F 3/0644* (2013.01); *G06F 3/0604* (2013.01); *G06F 3/064* (2013.01);
(Continued)

(58) Field of Classification Search
CPC ...... G06F 3/067; G06F 9/5077; G06F 15/167; G06F 21/10; G06F 21/6272; G06F 3/64;
(Continued)

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.
(Continued)

*Primary Examiner* — Robert B Harrell
(74) *Attorney, Agent, or Firm* — Garlick & Markison; Timothy W. Markison; Bruce E. Stuckman

(57) ABSTRACT

A method for execution by a storage unit of a dispersed storage network includes receiving a slice access request that includes a slice name. A first function is performed on the slice name to produce a bucket file identifier. A second function is performed on the slice name to produce a bucket identifier. A bucket file of a plurality of bucket files is accessed, where the bucket file is identified by utilizing the bucket file identifier. A bucket of a plurality of buckets within the bucket file is accessed, where the bucket is identified by utilizing the bucket identifier. It is determined to modify a number of buckets in the bucket file based on bucket utilization. An attribute of the second function is modified in response, where the attribute is associated with the number of buckets in the bucket file.

20 Claims, 6 Drawing Sheets

Related U.S. Application Data

(60) Provisional application No. 62/140,861, filed on Mar. 31, 2015.

(52) U.S. Cl.
CPC ............ *G06F 3/067* (2013.01); *G06F 3/0619* (2013.01); *G06F 3/0643* (2013.01); *G06F 11/1076* (2013.01)

(58) Field of Classification Search
CPC . G06F 3/67; G06F 3/604; G06F 3/619; G06F 3/643; G06F 3/644; G06F 11/1076; G06F 13/00; G11B 20/00086; H04L 29/06; H04L 29/08549; H04L 63/12; H04L 63/0428; H04L 2463/101
USPC .............................................. 709/215; 726/30
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2014/0068791 | A1* | 3/2014 | Resch ................. G06F 21/6272 726/30 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working; Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

(56) References Cited

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

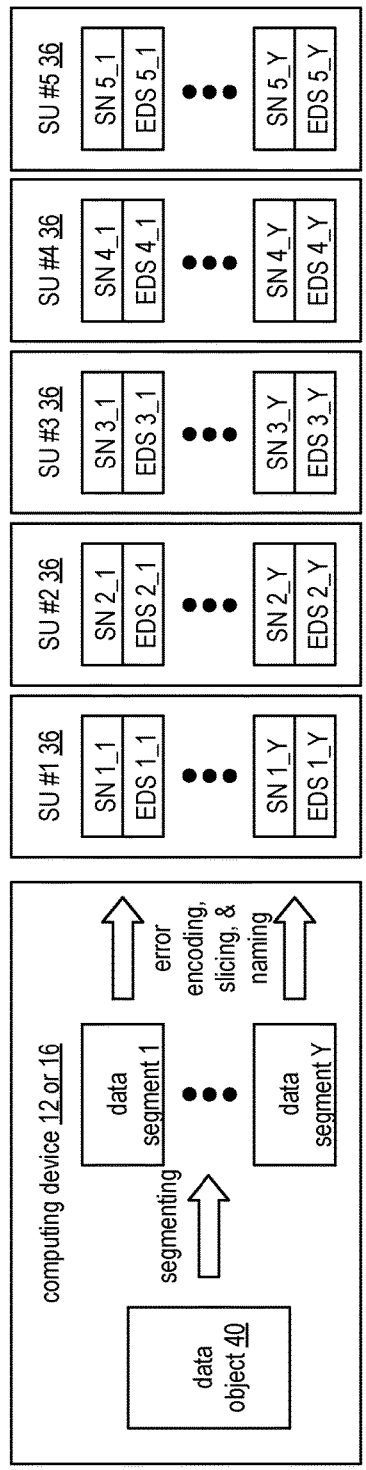
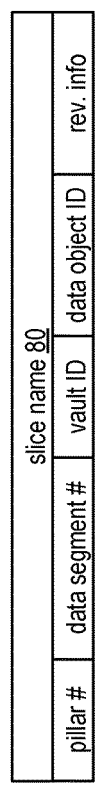
FIG. 3
FIG. 4
FIG. 5
FIG. 6

US 10,528,282 B2

MODIFYING AND UTILIZING A FILE STRUCTURE IN A DISPERSED STORAGE NETWORK

CROSS-REFERENCE TO RELATED APPLICATIONS

The present U.S. Utility patent application claims priority pursuant to 35 U.S.C. § 120 as a continuation-in-part of U.S. Utility application Ser. No. 15/006,735, entitled "MODIFYING STORAGE CAPACITY OF A SET OF STORAGE UNITS", filed Jan. 26, 2016, which claims priority pursuant to 35 U.S.C. § 119(e) to U.S. Provisional Application No. 62/140,861, entitled "MODIFYING STORAGE CAPACITY OF A STORAGE UNIT POOL", filed Mar. 31, 2015, both of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
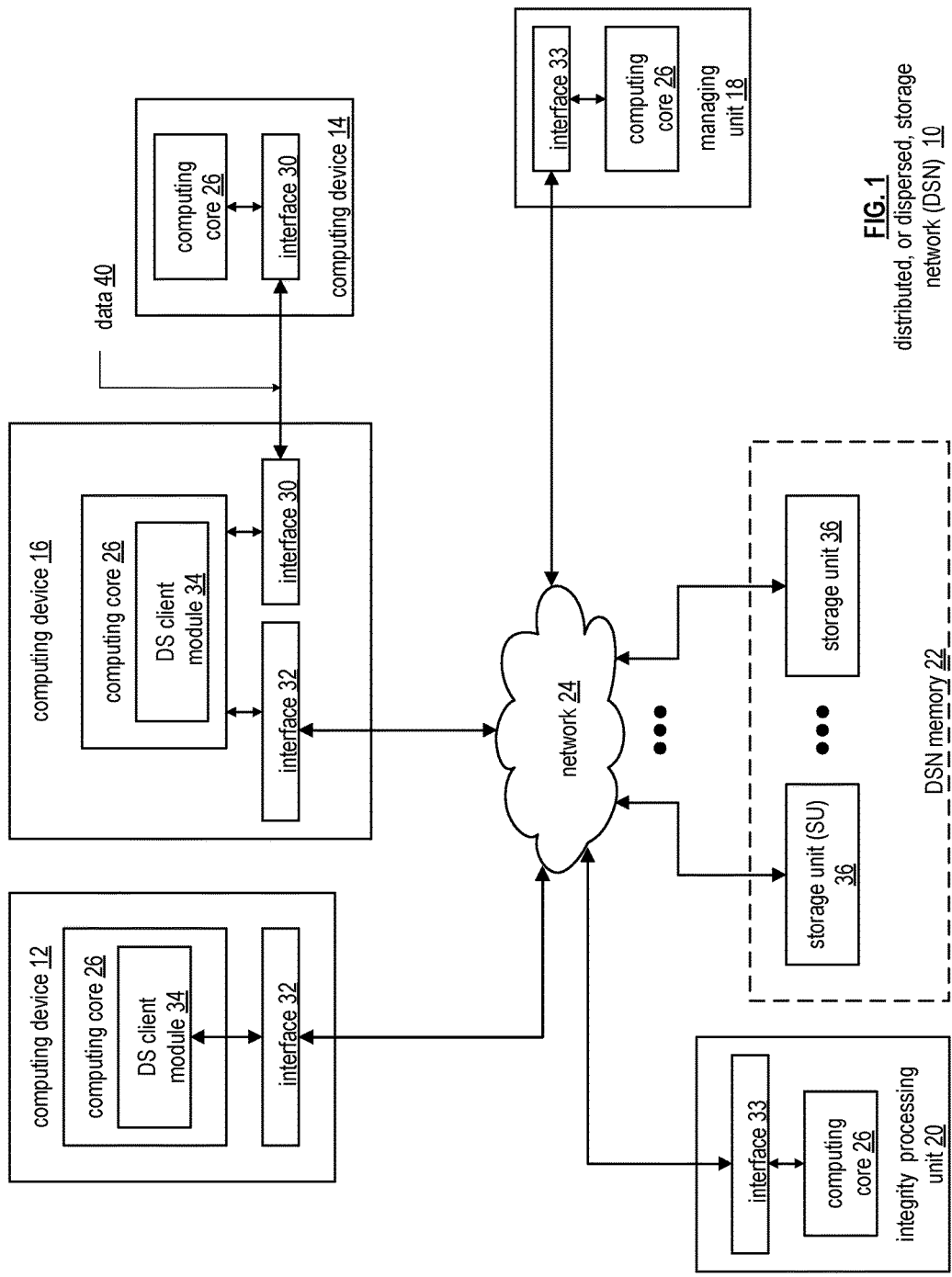
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
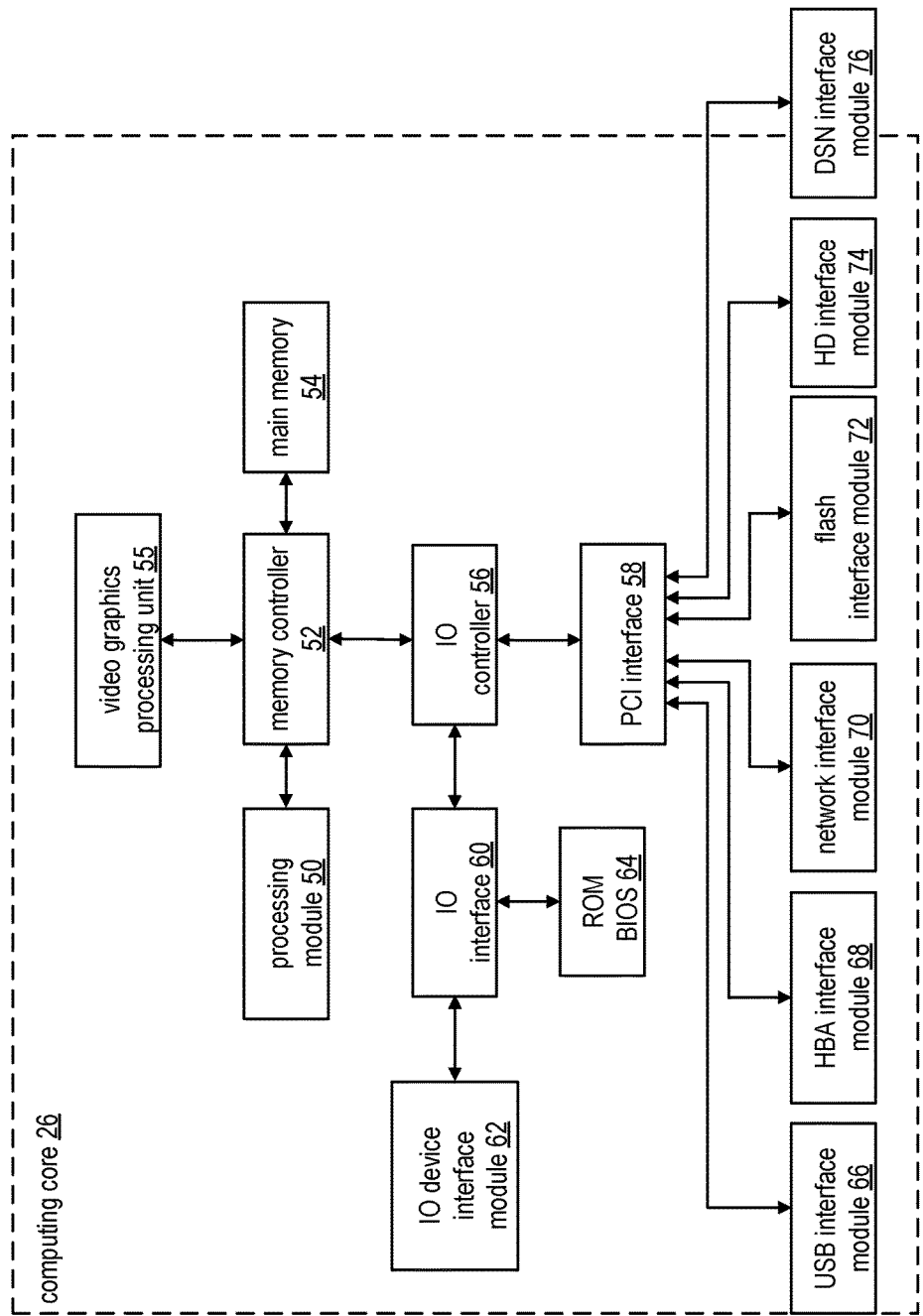
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
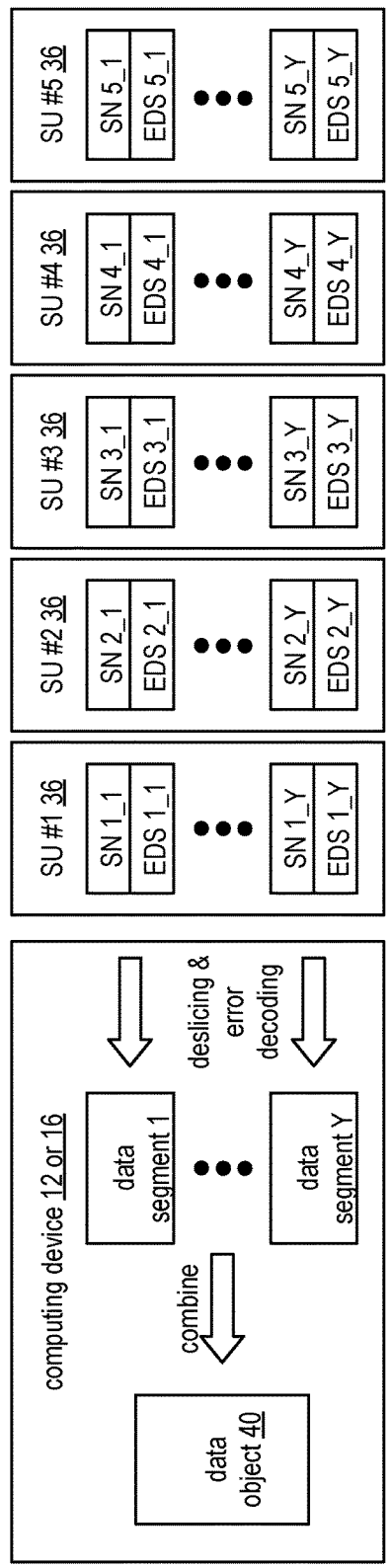
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
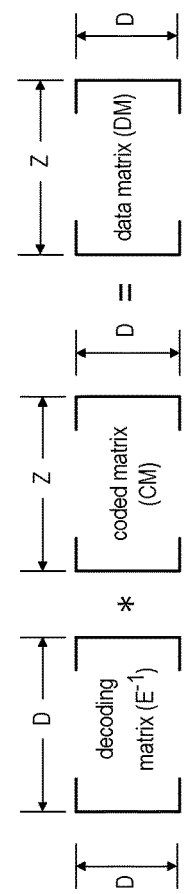
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
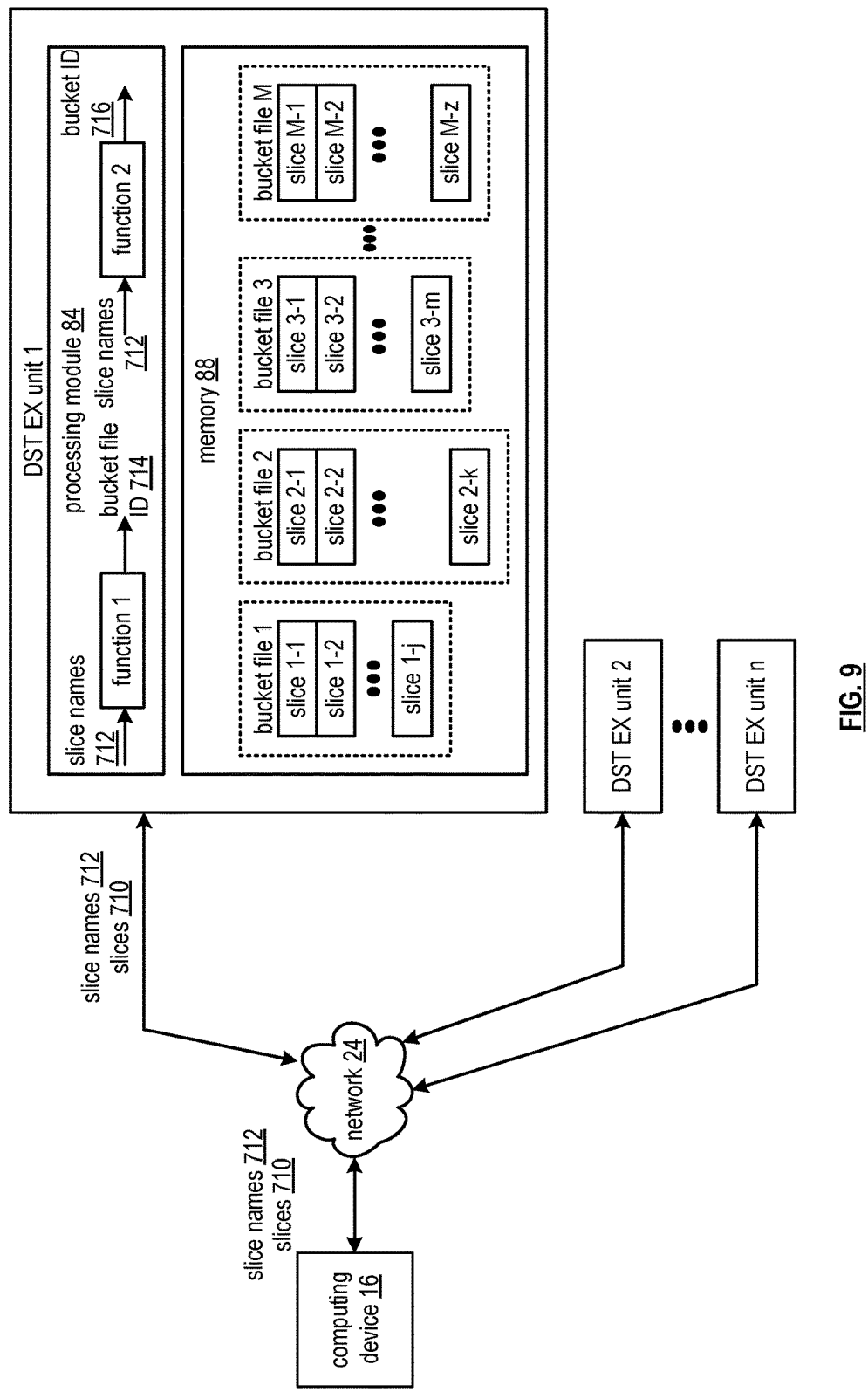
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes the computing device 16 of FIG. 1, the network 24 of FIG. 1, and a set of DST execution (EX) units 1-n. Each DST execution unit can include a processing module 84 and a memory 88, which can be implemented by utilizing the computing core 26 of FIG. 2. Each DST execution unit can be implemented utilizing the storage unit 36 of FIG. 1. The processing module 84 can include, or otherwise be operable to perform, a first function and a second function. Each of the functions can include a deterministic function, and the deterministic function can include one or more of a hashing function, a hash based message authentication code function, a sponge function, a mask generating function, and/or any other one-way deterministic function. The DSN functions to modify and utilize a file structure for storage of encoded data slices.

Packed Slice Storage (PSS) is a mechanism that can be utilized for trading increased memory usage for fewer seek operations by maintaining in-memory data structures for locating the approximate location of slices stored on memory devices. In some approaches, a single hash function or other one-way function can be applied on some portion of a slice name to map to a "bucket file name" of a bucket file and a "bucket identifier" within that bucket file. However, this approach is less efficient for under-utilized PSS systems (storing much fewer than the maximum number of possible buckets) in that the total amount of memory must be pre-allocated and used from the start, and the total number of possible bucket identifiers is generally made very large (to keep collision probability low even in full systems). Instead of having a large two-dimensional array of all bucket file names and bucket identifiers allocated in memory, instead a large number of variably sized one-dimensional arrays may be used, allowing for dynamic resizing of the number of bucket identifiers within each bucket file. Instead of a single hash to a position within a two-dimensional array, two hashes can be performed (and/or different bits from the same hash function are considered independently). The first hash (or former bits of the single hash) can be used to determine the appropriate one-dimensional array corresponding to a given bucket file. The second hash (or the latter bits of the single hash) are then used to determine a bucket identifier within that array. When the bucket is rewritten (e.g. during compaction operations), its number of buckets can be expanded as necessary to reduce collision rates and the one-dimensional array can be increased. When the number of buckets in a given file is increased, the number of bits of the hash function used in the second hash calculation can be adapted to accommodate the higher number of possible buckets. Thus, when the system is first initialized, very little memory need be used, and as the system grows the number of buckets can be increased as required to maintain a low collision rate (at the cost of increased memory usage).

In an example of operation of the modifying and utilizing of the file structure for the storage of the encoded data slices, the processing module 84 receives a plurality of slice access requests that includes one or more of slice names 712 and encoded data slices 710. For example, the processing module 84 receives, via the network 24, from the DST processing unit 16 a write slice request that includes an encoded data slice 710 and a slice name 712.

For each request, the processing module 84 can perform the first function on the received slice name to produce a bucket file identifier (ID) 714. For example, the processing module 84 performs a first deterministic function on at least a portion of the slice name to produce at least a portion of a bucket file ID 714, where the bucket file ID is associated with a bucket file, where a memory structure of the memory 88 includes a plurality of bucket files 1-M, and where a varying number of encoded data slices are packed into various bucket files to facilitate storage.

Having produced the bucket file ID 714, the processing module 84 can perform the second function on the received slice name 712 to produce a bucket ID 716, where an attribute (e.g., a modulo function associated with a number of buckets within a bucket file, where each bucket stores one encoded data slice) of the second function is based on the first function. For example, the processing module 84 performs a second deterministic function on the at least a portion of the slice name to produce an interim number and performs a modulo function on the interim number to produce at least a portion of the bucket ID.

Having produced the bucket ID 716, the processing module 84 can access a corresponding bucket file utilizing the bucket file ID 714. For example, the processing module 84 accesses bucket file 3 of the local file system utilizing the bucket file ID of 3. Having accessed the bucket file, the processing module 84 can access a bucket within the bucket file utilizing the bucket ID 716. For example, the processing module 84 uses a bucket ID of 2 as an index to directly access an encoded data slice 3-2 in a second bucket of the bucket file 3.

From time to time, the processing module 84 may determine to modify a number of buckets within a particular bucket file based on a level of utilization of the bucket file. For example, the processing module 84 can indicate to modify the number of buckets when a utilization level of the bucket file (e.g., number of buckets use divided by a total number of available buckets) compares unfavorably to a corresponding utilization threshold level (e.g., using too many, using too few). When determining to modify the number of buckets, the processing module 84 can modify the attribute of the second function to produce an updated attribute of the second function. For example, the processing module 84 increases the modulo when too many buckets are utilized. As another example, the processing module decreases the modulo when too few buckets are utilized.

In various embodiments, a processing system of a storage unit includes at least one processor and a memory that stores operational instructions, that when executed by the at least one processor cause the processing system to receive a slice access request that includes a slice name. A first function is performed on the slice name to produce a bucket file identifier. A second function is performed on the slice name to produce a bucket identifier. A bucket file of a plurality of bucket files is accessed, where the bucket file is identified by utilizing the bucket file identifier. A bucket of a plurality of buckets within the bucket file is accessed, where the bucket is identified by utilizing the bucket identifier. It is determined to modify a number of buckets in the bucket file based on bucket utilization. An attribute of the second function is modified in response, where the attribute is associated with the number of buckets in the bucket file.

In various embodiments, the slice name is associated with one encoded data slice of a set of encoded data slices, where a data segment was dispersed storage error encoded to produce the set of encoded data slices for storage in a set of storage units that includes the storage unit. In various embodiments, producing the bucket file identifier includes performing a first one-way deterministic function on at least a portion of the slice name to produce the bucket file identifier. In various embodiments, the bucket file includes an encoded data slice associated with the slice name, and the bucket file further includes a number of entries indicator.

In various embodiments, producing the bucket identifier includes obtaining a unique attribute associated with the second function based on the bucket file identifier by performing a lookup. A second one-way deterministic function is applied to the at least a portion of the slice name utilizing the unique attribute to produce the bucket identifier. In various embodiments, the unique attribute is a modulo value, and the second one-way deterministic function includes performing a modulo operation utilizing the modulo value. In various embodiments, modifying the attribute of the second function includes increasing the modulo value when a bucket utilization level of the bucket file is greater than a maximum bucket utilization threshold level and decreasing the modulo value when the bucket utilization level of the bucket file is less than a minimum bucket utilization threshold level. The modified modulo value is associated with the bucket file identifier of the bucket file.

Figure 10:
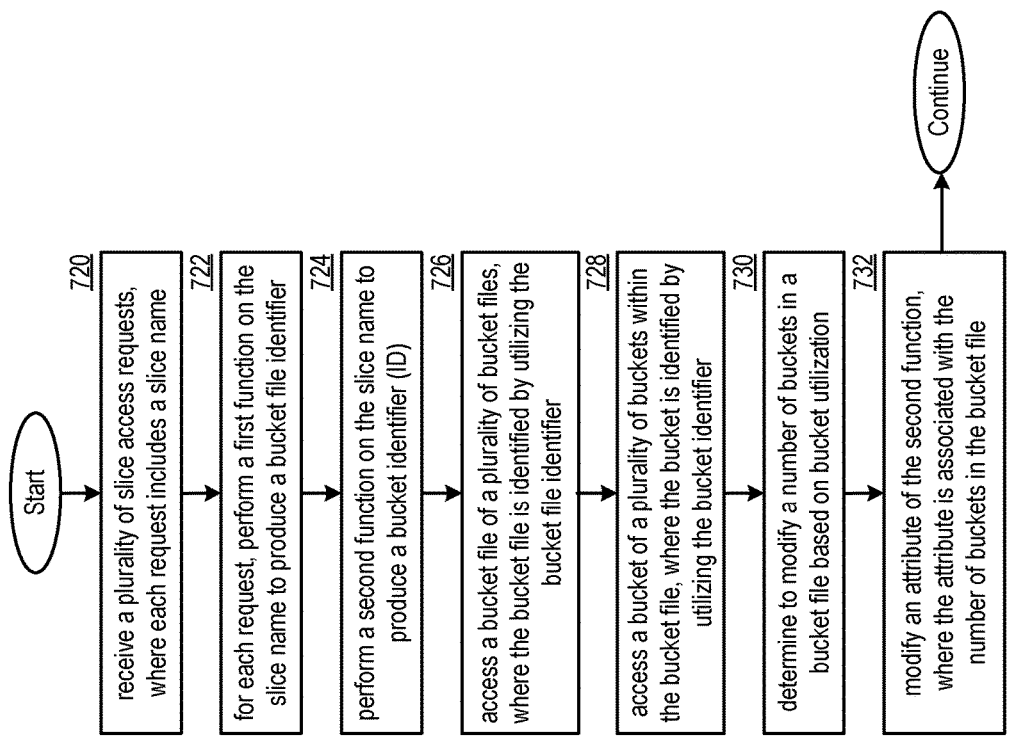
FIG. 10 is a logic diagram of an example of a method of modifying and utilizing a file structure in accordance with the present invention.

FIG. 10 is a flowchart illustrating an example of modifying and utilizing a file structure for storage of encoded data slices. In particular, a method is presented for use in association with one or more functions and features described in conjunction with FIGS. 1-9, for execution by a storage unit that includes a processor or via another processing system of a dispersed storage network that includes at least one processor and memory that stores instruction that configure the processor or processors to perform the steps described below.

The method includes step 720 where a processing system (e.g., the processing module of a storage unit and/or of a computing device) receives a plurality of slice access requests, where each request includes a slice name (e.g., write slice request, read slice requests). For each request, the method continues at step 722 where the processing system performs a first function on the slice name to produce a bucket file identifier (ID). For example, the processing system performs a first one-way deterministic function on at least a portion of the slice name to produce the bucket file ID.

The method continues at step 724 where the processing system performs a second function on the slice name to produce a bucket ID. For example, the processing system obtains a unique attribute (e.g., a modulo) associated with the second function based on the first deterministic function and/or based on the bucket file identifier (e.g., perform a lookup), and applies a second one-way deterministic function to the at least a portion of the slice name utilizing the unique attribute to produce the bucket ID.

The method continues at step 726 where the processing system accesses a bucket file of a plurality of bucket files, where the bucket file is identified by utilizing the bucket file identifier. For example, the processing system accesses a local file system utilizing the bucket file ID to locate and retrieve a corresponding bucket file. The method continues at step 728 where the processing system accesses a bucket of a plurality of buckets within the bucket file, where the bucket is identified by utilizing the bucket identifier. For example, the processing system utilizes the bucket ID to access an encoded data slice entry within the bucket file, where the bucket file includes the encoded data slice and can further include one or more of a byte count, a number of entries indicator, and/or the attribute.

The method continues at step 730 where the processing system determines to modify a number of buckets in a bucket file based on bucket utilization. For example, the processing system indicates the modifying the number of buckets when a bucket utilization level compares unfavorably to a corresponding bucket utilization threshold level. The method continues at step 732 where the processing system modifies an attribute of the second function, where the attribute is associated with the number of buckets in the bucket file. For example, the processing system increases the modulo attribute when the bucket utilization is greater than a maximum bucket utilization threshold level. As another example, the processing system decreases the modulo attribute when the bucket utilization is less than a minimum bucket utilization threshold level. The updated attribute can be stored in local memory or otherwise can be associated with the bucket file ID of the corresponding bucket file, and subsequent uses of the second function can utilize the modified attribute when the corresponding bucket file identifier is produced in subsequent uses of the first function.

In various embodiments, a non-transitory computer readable storage medium includes at least one memory section that stores operational instructions that, when executed by a processing system of a dispersed storage network (DSN) that includes a processor and a memory, causes the processing system to receive a slice access request that includes a slice name. A first function is performed on the slice name to produce a bucket file identifier. A second function is performed on the slice name to produce a bucket identifier. A bucket file of a plurality of bucket files is accessed, where the bucket file is identified by utilizing the bucket file identifier. A bucket of a plurality of buckets within the bucket file is accessed, where the bucket is identified by utilizing the bucket identifier. It is determined to modify a number of buckets in the bucket file based on bucket utilization. An attribute of the second function is modified in response, where the attribute is associated with the number of buckets in the bucket file.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing system", "processing module", "processing circuit", "processor", and/or "processing unit" may be used interchangeably, and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing system, processing module, module, processing circuit, and/or processing unit may be, or further include, memory and/or an integrated memory element, which may be a single memory device, a plurality of memory devices, and/or embedded circuitry of another processing system, processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing system, processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing system, processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing system, processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a storage unit that includes a processor, the method comprises:
   receiving a slice access request that includes a slice name;
   performing a first function on the slice name to produce a bucket file identifier;
   performing a second function on the slice name to produce a bucket identifier;
   accessing a bucket file of a plurality of bucket files, wherein the bucket file is identified by utilizing the bucket file identifier;
   accessing a bucket of a plurality of buckets within the bucket file, wherein the bucket is identified in the plurality of buckets within the bucket file by utilizing the bucket identifier;
   determining to modify a number of buckets in the bucket file based on bucket utilization; and
   modifying an attribute of the second function in response to determining to modify a number of buckets in the bucket file, wherein the attribute is associated with the number of buckets in the bucket file.

2. The method of claim 1, wherein producing the bucket identifier includes:
   obtaining a unique attribute associated with the second function based on the bucket file identifier by performing a lookup; and
   applying a second one-way deterministic function to the at least a portion of the slice name utilizing the unique attribute to produce the bucket identifier.

3. The method of claim 2, wherein the unique attribute is a modulo value, and wherein the second one-way deterministic function includes performing a modulo operation utilizing the modulo value.

4. The method of claim 3, wherein modifying the attribute of the second function includes:
   increasing the modulo value when a bucket utilization level of the bucket file is greater than a maximum bucket utilization threshold level;
   decreasing the modulo value when the bucket utilization level of the bucket file is less than a minimum bucket utilization threshold level; and
   associating the modified modulo value with the bucket file identifier of the bucket file in local memory.

5. The method of claim 1, wherein the slice name is associated with one encoded data slice of a set of encoded data slices, and wherein a data segment was dispersed storage error encoded to produce the set of encoded data slices for storage in a set of storage units that includes the storage unit.

6. The method of claim 1, wherein producing the bucket file identifier includes performing a first one-way deterministic function on at least a portion of the slice name to produce the bucket file identifier.

7. The method of claim 1, wherein the bucket file includes an encoded data slice associated with the slice name, and wherein the bucket file further includes a number of entries indicator.

8. A processing system of a storage unit comprises:
   at least one processor;
   a memory that stores operational instructions, that when executed by the at least one processor cause the processing system to:
     receive a slice access request that includes a slice name;
     perform a first function on the slice name to produce a bucket file identifier;
     perform a second function on the slice name to produce a bucket identifier;
     access a bucket file of a plurality of bucket files, wherein the bucket file is identified by utilizing the bucket file identifier;
     access a bucket of a plurality of buckets within the bucket file, wherein the bucket is identified in the plurality of buckets within the bucket file by utilizing the bucket identifier;
     determine to modify a number of buckets in the bucket file based on bucket utilization; and
     modify an attribute of the second function in response to determining to modify a number of buckets in the bucket file, wherein the attribute is associated with the number of buckets in the bucket file.

9. The processing system of claim 8, wherein producing the bucket identifier includes:
   obtaining a unique attribute associated with the second function based on the bucket file identifier by performing a lookup; and
   applying a second one-way deterministic function to the at least a portion of the slice name utilizing the unique attribute to produce the bucket identifier.

10. The processing system of claim 9, wherein the unique attribute is a modulo value, and wherein the second one-way deterministic function includes performing a modulo operation utilizing the modulo value.

11. The processing system of claim 10, wherein modifying the attribute of the second function includes:
    increasing the modulo value when a bucket utilization level of the bucket file is greater than a maximum bucket utilization threshold level;
    decreasing the modulo value when the bucket utilization level of the bucket file is less than a minimum bucket utilization threshold level; and
    associating the modified modulo value with the bucket file identifier of the bucket file in local memory.

12. The processing system of claim 8, wherein the slice name is associated with one encoded data slice of a set of encoded data slices, and wherein a data segment was dispersed storage error encoded to produce the set of encoded data slices for storage in a set of storage units that includes the storage unit.

13. The processing system of claim 8, wherein producing the bucket file identifier includes performing a first one-way deterministic function on at least a portion of the slice name to produce the bucket file identifier.

14. The processing system of claim 8, wherein the bucket file includes an encoded data slice associated with the slice name, and wherein the bucket file further includes a number of entries indicator.

15. A non-transitory computer readable storage medium comprises:
at least one memory section that stores operational instructions that, when executed by a processing system of a dispersed storage network (DSN) that includes a processor and a memory, causes the processing system to:
receive a slice access request that includes a slice name;
perform a first function on the slice name to produce a bucket file identifier;
perform a second function on the slice name to produce a bucket identifier;
access a bucket file of a plurality of bucket files, wherein the bucket file is identified by utilizing the bucket file identifier;
access a bucket of a plurality of buckets within the bucket file, wherein the bucket is identified in the plurality of buckets within the bucket file by utilizing the bucket identifier;
determine to modify a number of buckets in the bucket file based on bucket utilization; and
modify an attribute of the second function in response to determining to modify a number of buckets in the bucket file, wherein the attribute is associated with the number of buckets in the bucket file.

16. The non-transitory computer readable storage medium of claim 15, wherein producing the bucket identifier includes:
obtaining a unique attribute associated with the second function based on the bucket file identifier by performing a lookup; and
applying a second one-way deterministic function to the at least a portion of the slice name utilizing the unique attribute to produce the bucket identifier.

17. The non-transitory computer readable storage medium of claim 16, wherein the unique attribute is a modulo value, and wherein the second one-way deterministic function includes performing a modulo operation utilizing the modulo value.

18. The non-transitory computer readable storage medium of claim 17, wherein modifying the attribute of the second function includes:
increasing the modulo value when a bucket utilization level of the bucket file is greater than a maximum bucket utilization threshold level;
decreasing the modulo value when the bucket utilization level of the bucket file is less than a minimum bucket utilization threshold level; and
associating the modified modulo value with the bucket file identifier of the bucket file in local memory.

19. The non-transitory computer readable storage medium of claim 15, wherein the slice name is associated with one encoded data slice of a set of encoded data slices, and wherein a data segment was dispersed storage error encoded to produce the set of encoded data slices for storage in a set of storage units.

20. The non-transitory computer readable storage medium of claim 15, wherein producing the bucket file identifier includes performing a first one-way deterministic function on at least a portion of the slice name to produce the bucket file identifier.

\* \* \* \* \*